US012664938B2

(12) United States Patent
Yoon et al.

(10) Patent No.: US 12,664,938 B2
(45) Date of Patent: Jun. 23, 2026

(54) DISPLAY DEVICE

(71) Applicant: SAMSUNG DISPLAY CO., LTD., Yongin-si (KR)

(72) Inventors: Seokyoung Yoon, Yongin-si (KR); Junhan Ko, Yongin-si (KR); Jong-Woong Park, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/928,463

(22) Filed: Oct. 28, 2024

(65) Prior Publication Data

US 2025/0218367 A1 Jul. 3, 2025

(30) Foreign Application Priority Data

Jan. 3, 2024 (KR) ........................ 10-2024-0001098

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0819* (2013.01); *G09G 2300/0842* (2013.01); *G09G 2300/0861* (2013.01); *G09G 2310/08* (2013.01); *G09G 2320/0257* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 9,159,284 B2 | 10/2015 | Park et al. | | |
| 10,902,789 B2 * | 1/2021 | Park | G09G 3/3266 | |
| 11,238,808 B2 | 2/2022 | Lee et al. | | |
| 11,380,286 B2 | 7/2022 | Lee et al. | | |
| 11,929,024 B2 * | 3/2024 | Kim | G09G 3/3233 | |
| 2010/0141643 A1 * | 6/2010 | Li | G09G 3/3648 | 345/214 |
| 2023/0230535 A1 * | 7/2023 | Hu | G09G 3/3233 | 345/55 |

FOREIGN PATENT DOCUMENTS

| | | |
|---|---|---|
| KR | 10-2021-0016205 A | 2/2021 |
| KR | 10-2021-0101679 A | 8/2021 |
| KR | 10-2021-0101968 A | 8/2021 |
| KR | 10-2023-0102125 A | 7/2023 |

* cited by examiner

*Primary Examiner* — Matthew Yeung
(74) *Attorney, Agent, or Firm* — F. CHAU & ASSOCIATES, LLC

(57) ABSTRACT

A display device is configured to be driven in units of frame and includes a pixel driving circuit electrically connected to a light-emitting diode. The pixel driving circuit includes a first transistor and a second transistor. The first transistor includes a second electrode electrically connected to the light-emitting diode, and a gate electrode electrically connected to a second node. The second transistor includes a first electrode configured to receive a data signal and a gate electrode configured to receive a second scan signal. The frame includes a first frame and a second frame, the data signal includes a first data signal provided in the first frame and a second data signal provided in the second frame, and the second scan signal provided in the first frame and the second frame may have different waveforms.

22 Claims, 6 Drawing Sheets

DISPLAY DEVICE

CROSS-REFERENCE TO RELATED APPLICATIONS

This U.S. non-provisional patent application claims priority under 35 U.S.C. § 119 of Korean Patent Application No. 10-2024-0001098, filed on Jan. 3, 2024, the entire contents of which are hereby incorporated by reference.

BACKGROUND

1. Technical Field

One or more embodiments described herein relate to a display device and a method of driving the display device.

2. Discussion of Related Art

A display device may be configured of various electronic components such as a display panel configured to display an image, an input sensor configured to sense an external input, an electronic module, and the like. The electronic components may be electrically connected with each other through signal lines arranged in various ways. The display panel includes a plurality of pixels. Each of the plurality of pixels includes a light-emitting element configured to emit light and a pixel driving circuit configured to control an amount of current flowing to the light-emitting element.

SUMMARY

One or more embodiments described herein provide a display device having improved display quality.

One or more embodiments described herein provide a display device with reduced power consumption.

One or more embodiments described herein may provide a display device which reduces or prevents afterimage effects.

One or more embodiments described herein may provide a display device suitable for use in a high-speed driving environment.

An embodiment of the inventive concept provides a display device including a display panel configured to be driven in units of frame, and including a pixel including a pixel driving circuit and a light-emitting diode electrically connected to the pixel driving circuit, wherein the pixel driving circuit includes: a first transistor including a first electrode configured to receive a first driving voltage and electrically connected to a first node, a second electrode electrically connected to the light-emitting diode, and a gate electrode electrically connected to a second node; and a second transistor including a first electrode configured to receive a data signal, a second electrode electrically connected to the first node, and a gate electrode configured to receive a second scan signal, wherein the frame includes successive first and second frames, the data signal includes a first data signal and a second data signal different from the first data signal, and, when the first data signal is provided in the first frame and the second data signal is provided in the second frame, the second scan signal provided in the first frame has a different waveform from the second scan signal provided in the second frame.

In an embodiment, the second data signal may have a higher voltage level than the first data signal.

In an embodiment, the second scan signal provided in the first frame may have a first pulse width, and the second scan signal provided in the second frame may have a second pulse width different from the first pulse width.

In an embodiment, the second pulse width may be smaller than the first pulse width.

In an embodiment, the light-emitting diode is configured to emit light having a first grayscale value in the first frame and the light-emitting diode is configured to emit light having a second grayscale value higher than the first grayscale value in the second frame.

In an embodiment, the second scan signal provided in the first frame may have a first amplitude, and the second scan signal provided in the second frame may have a second amplitude different from the first amplitude.

In an embodiment, the first amplitude may be greater than the second amplitude.

In an embodiment, the display device may further include a driving capacitor connected between a first voltage line through which the first driving voltage is provided and the second node.

In an embodiment, the display device may further include a third transistor including a first electrode electrically connected to the second electrode of the first transistor, a second electrode electrically connected to the second node, and a gate electrode configured to receive the second scan signal.

In an embodiment, the display device may further include a third transistor including a first electrode electrically connected to the second electrode of the first transistor, a second electrode electrically connected to the second node, and a gate electrode configured to receive the second scan signal.

In an embodiment, the display device may further include a fourth transistor including a first electrode electrically connected to the second node, a second electrode configured to receive an initialization voltage, and a gate electrode configured to receive a first scan signal different from the second scan signal.

In an embodiment, the display device may further include a fifth transistor including a first electrode configured to receive the first driving voltage, a second electrode electrically connected to the first node, and a gate electrode configured to receive an emission signal.

In an embodiment, the display device may further include a sixth transistor including a first electrode electrically connected to the second electrode of the first transistor, a second electrode electrically connected to the light-emitting diode, and a gate electrode configured to receive the emission signal.

In an embodiment, the display device may further include a seventh transistor including a first electrode electrically connected to the light-emitting diode, a second electrode configured to receive the initialization voltage, and a gate electrode configured to receive the second scan signal.

In an embodiment of the inventive concept, a display device includes a display panel configured to be driven in units of frame, and including a pixel including a pixel driving circuit and a light-emitting diode electrically connected to the pixel driving circuit, wherein the pixel driving circuit may include: a first transistor including a first electrode configured to receive a first driving voltage and electrically connected to a first node, a second electrode electrically connected to the light-emitting diode, and a gate electrode electrically connected to a second node; and a second transistor including a first electrode configured to receive a data signal, a second electrode electrically connected to the first node, and a gate electrode configured to receive a second scan signal, wherein the frame includes successive first and second frames, the data signal includes a first data signal and a second data signal different from the first data signal, and, when the first data signal is provided in the first frame and the second data signal is provided in the second frame, a pulse width of the second signal provided in the first frame is different from a pulse width of the second scan signal provided in the second frame.

In an embodiment, the light-emitting diode is configured to emit light having a first grayscale value in the first frame, and the light-emitting diode is configured to emit light having a second grayscale value higher than the first grayscale value in the second frame.

In an embodiment, the second data signal may have a voltage level higher than the first data signal.

In an embodiment, the second scan signal provided in the first frame may have a first pulse width, and the second scan signal provided in the second frame may have a second pulse width smaller than the first pulse width.

In an embodiment, the display device may further include a third transistor including a first electrode electrically connected to the second electrode of the first transistor, a second electrode electrically connected to the second node, and a gate electrode configured to receive the second scan signal.

In an embodiment, the display device may further include a fourth transistor including a first electrode electrically connected to the second node, a second electrode configured to receive an initialization voltage, and a gate electrode configured to receive a first scan signal different from the second scan signal.

In an embodiment, the display device may further include a fifth transistor comprising a first electrode configured to receive the first driving voltage, a second electrode electrically connected to the first node, and a gate electrode configured to receive an emission signal.

In accordance with one or more additional embodiments, a method is provided for controlling operation of a display device which includes a pixel driving circuit electrically connected to a light-emitting diode, the pixel driving circuit including a driving transistor and first transistor controlled by a scan signal to place the driving transistor in a diode-connected state.

The method may include charging a node coupled to a gate of the driving transistor based on a voltage of a first data signal applied in a first frame, the node charged to a first target voltage based on a first parameter of the scan signal; controlling emission of light from the light-emitting diode of the pixel based on the first target voltage; determining a difference between a voltage of a second data signal and the voltage of the first data signal; determining a second parameter of the scan signal from a look-up table based on the difference between the voltage of the second data signal and the voltage of the first data signal; charging the node coupled to the gate of the driving transistor based on the voltage of the second data signal in a second frame, the node charged to a second target voltage based on the second parameter of the scan signal; and controlling emission of light from the light-emitting diode of the pixel based on the second target voltage.

The first parameter may be a first width of the scan signal, the second parameter may be a second width of the scan signal, and the second width may be less than the first width. The first parameter may be a first amplitude of the scan signal, the second parameter may be a second amplitude of the scan signal, and the second amplitude may be less than the first amplitude. The first data signal may correspond to a first grayscale value, the second data signal may correspond to a second grayscale value, and the second grayscale value may be greater than the first grayscale value.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

It will be understood that when an element or layer is referred to as being "on", "connected to" or "coupled to" another element or layer, it can be directly on, connected or coupled to the other element or intervening third elements may be present. The term "and/or" includes any and all combinations of one or more of the associated items.

Terms such as first, second, and the like may be used to describe various components, but these components should not be limited by the terms. Such terms are only used for distinguishing one element from other elements. For instance, a first component may be referred to as a second component, or similarly, a second component may be referred to as a first component, without departing from the scope of the present disclosure. The singular expressions include plural expressions unless the context clearly dictates otherwise.

It should be understood that the terms "comprise" or "have" are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which example embodiments belong. In addition, it will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
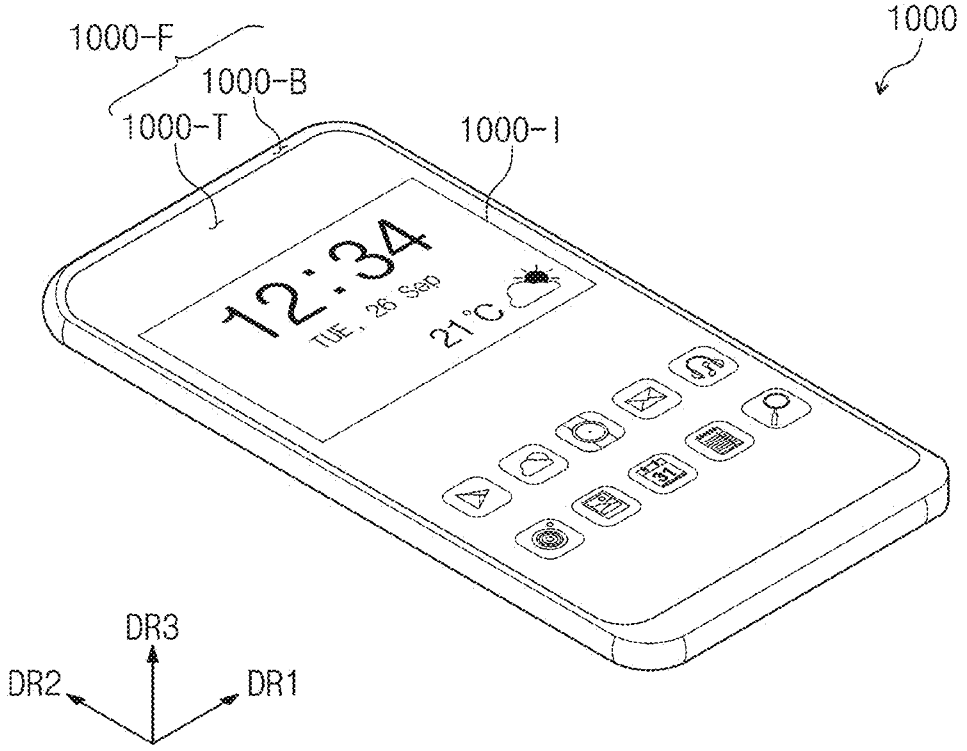
FIG. 1 is a perspective view of a display device according to an embodiment of the inventive concept.

FIG. 1 is a perspective view of a display device 1000 according to an embodiment of the inventive concept.

Referring to FIG. 1, the display device 1000 may be activated according to an electrical signal. The display device 1000 may include various embodiments. For example, the display device 1000 may be used for small and mid-sized display devices such as desktop computers, notebook computers, personal digital assistants (PDAs), vehicle navigation units, game consoles, cameras or the like. In other embodiments, the display device 1000 may be used for large-sized display devices such as TVs, monitors, outdoor advertising boards or the like. In addition, the above-described is only presented as an example, and may also be employed to other electronic apparatuses without departing from the scope of the inventive concept. In the embodiment, the example display device 1000 is shown as a smartphone.

The display device 1000 may include a display surface 1000-F parallel to a first direction DR1 and a second direction DR2 that intersects with the first direction DR1. The display surface 1000-F may include a transmissive area 1000-T and a bezel area 1000-B.

An image 1000-I may be displayed towards a third direction DR3 on the transmissive area 1000-T. The third direction DR3 may be referred to as a thickness direction. The image 1000-I may be a still image or a moving image. In FIG. 1, examples of the image 1000-I are given in the form of a clock window and icons. The display surface 1000-F on which the image 1000-I is displayed may correspond to the front surface of the display device 1000.

In the embodiment, the front surface (or the top surface) and the rear surface (or the bottom surface) of the display device 1000 may be based on a direction in which the image 1000-I is displayed. The front surface and the rear surface may face each other in the third direction DR3, and the normal directions of the front surface and the rear surface may be parallel to the third direction DR3. In the specification, the expression "when viewed in a plan view" may mean when viewed from the third direction DR3. The image 1000-I may not be displayed on the bezel area 1000-B.

Figure 2:
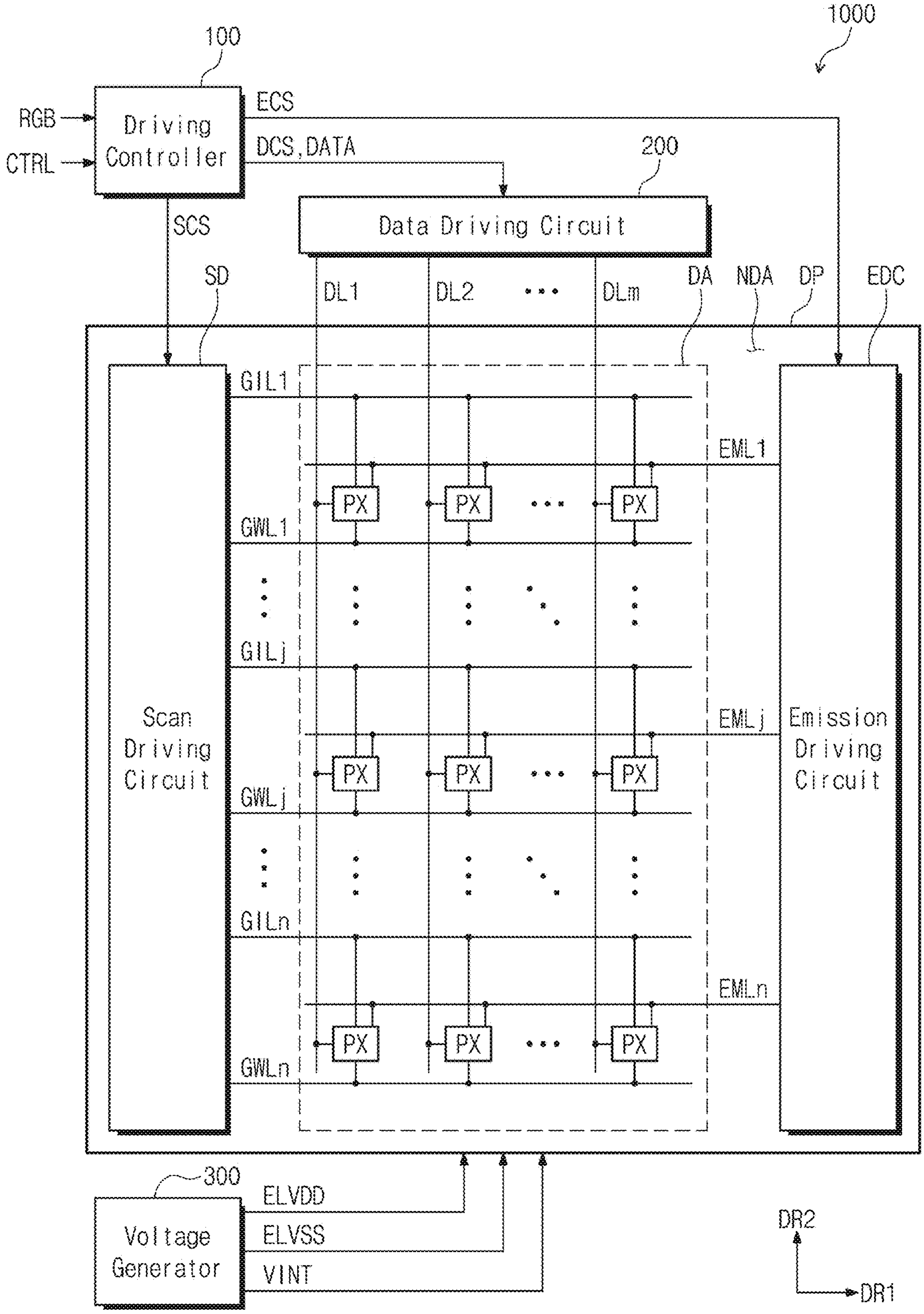
FIG. 2 is a block diagram of a display device according to an embodiment of the inventive concept.

FIG. 2 is a block diagram of the display device 1000 according to an embodiment of the inventive concept.

Referring to FIG. 2, the display device 1000 includes a display panel DP, a driving controller 100, a data driving circuit 200, and a voltage generator 300. The display panel DP may include a plurality of pixels PX.

The driving controller 100 receives image information RGB and a control signal CTRL from a host or other external source. The driving controller 100 generates image data DATA by converting the data format of the image information RGB to meet the interface specification with the data driving circuit 200. The driving controller 100 outputs a scan control signal SCS, a data control signal DCS, and an emission control signal ECS.

The data driving circuit 200 receives the data control signal DCS and the image data DATA from the driving controller 100. The data driving circuit 200 converts the image data DATA into data signals, and outputs the data signals to respective ones of the plurality of pixels through a plurality of data lines DL1 to DLm, to be described in greater detail below. The data signals are analog voltages corresponding to grayscale values of the image data DATA.

The voltage generator 300 generates voltages for operating the display panel DP. In the embodiment, the voltage generator 300 generates a first driving voltage ELVDD, a second driving voltage ELVSS, and a initialization voltage VINT.

The display panel DP includes scan lines GIL1 to GILn and GWL1 to GWLn, emission control lines EML1 to EMLn, data lines DL1 to DLm, and the plurality of pixels PX. The scan lines GIL1 to GILn and GWL1 to GWLn may include the first scan lines GIL1 to GILn and the second scan lines GWL1 to GWLn. The display panel DP may further include a scan driving circuit SD and an emission driving circuit EDC. In an embodiment, the scan driving circuit SD is arranged at a first side of the display panel DP. The scan lines GIL1 to GILn and GWL1 to GWLn extend in the first direction DR1 from the scan driving circuit SD and may be arranged in an alternating relationship in the second direction DR2.

The display panel DP may include a display area DA corresponding to the transmissive area 1000-T and a non-display area NDA corresponding to the bezel area 1000-B (e.g, see FIG. 1). The plurality of pixels PX may be disposed in the display area DA, and the scan driving circuit SD and the emission driving circuit EDC may be disposed in the non-display area NDA, which, for example, may partially or entirely overlap the bezel area 1000-B.

The emission driving circuit EDC is arranged at a second side of the display panel DP. The emission control lines EML1 to EMLn extend in the opposite direction to the first direction DR1 from the emission driving circuit EDC.

The first scan lines GIL1 to GILn, the second scan lines GWL1 to GWLn, and the emission control lines EML1 to EMLn are arranged to be spaced apart from each other in the second direction DR2. The data lines DL1 to DLm extend in the opposite direction to the second direction DR2 from the data driving circuit 200, and are arranged to be spaced apart from each other in the first direction DR1.

In the example shown in FIG. 2, the scan driving circuit SD and the emission driving circuit EDC are arranged to face each other with the pixels PX interposed therebetween, but the inventive concept is not limited thereto. For example, the scan driving circuit SD and the emission driving circuit EDC may be disposed to be adjacent in any one of the first side or the second side of the display panel DP. In an embodiment, the scan driving circuit SD and the emission driving circuit EDC may be incorporated into one integrated circuit.

The plurality of pixels PX are electrically connected to the first scan lines GIL1 to GILn, the second scan lines GWL1 to GWLn, the emission control lines EML1 to EMLn, and the data lines DL1 to DLm. Each of the plurality of pixels PX may be electrically connected to two scan lines and one emission control line. For example, as shown in FIG. 2, the pixels in the first row may be connected to a first scan line GIL1, a first second scan line GWL1, and a first emission control line EML1. In addition, the pixels in the j-th row may be connected to a j-th first scan line GILj, a j-th second scan line GWLj, and a j-th emission control line EMLj. This connection of scan and emission control lines depends on the specific structure of each pixel driving circuit (e.g., the number and arrangement of transistors), and therefore may vary among embodiments.

In one embodiment, each of the second scan line GWL1 to GWLj may be connected to at least one of a plurality of transistors included in one pixel PX. For example, the j-th second scan line GWLj may be connected to each gate electrode of a second transistor T2, a third transistor T3, and a seventh transistor T7 (e.g., see FIG. 3).

Each of the emission control line EML1 to EMLj may be connected to at least one of the plurality of transistors included in one pixel PX. For example, the j-th emission control line EMLj may be connected to each gate electrode of a fifth transistor T5 and a sixth transistor T6 (e.g., see FIG. 3).

Each of the plurality of pixels PX includes a light-emitting diode ED and a pixel driving circuit PXC (e.g., see FIG. 3), which is configured to control the emission of light from the light-emitting diode ED. The pixel driving circuit PXC may include one or more transistors and one or more capacitors. The scan driving circuit SD and the emission driving circuit EDC may include transistors provided through the same process as the pixel driving circuit PXC.

Each of the plurality of pixels PX receives the first driving voltage ELVDD, the second driving voltage ELVSS, and the initialization voltage VINT from the voltage generator 300.

The scan driving circuit SD receives the scan control signal SCS from the driving controller 100. In response to the scan driving signal SCS, the scan driving circuit SD may output scan signals to the first scan lines GIL1 to GILn and the second scan lines GWL1 to GWLn. The operations related to the second scan lines GWL1 to GWLn will be described in detail below.

Figure 3:
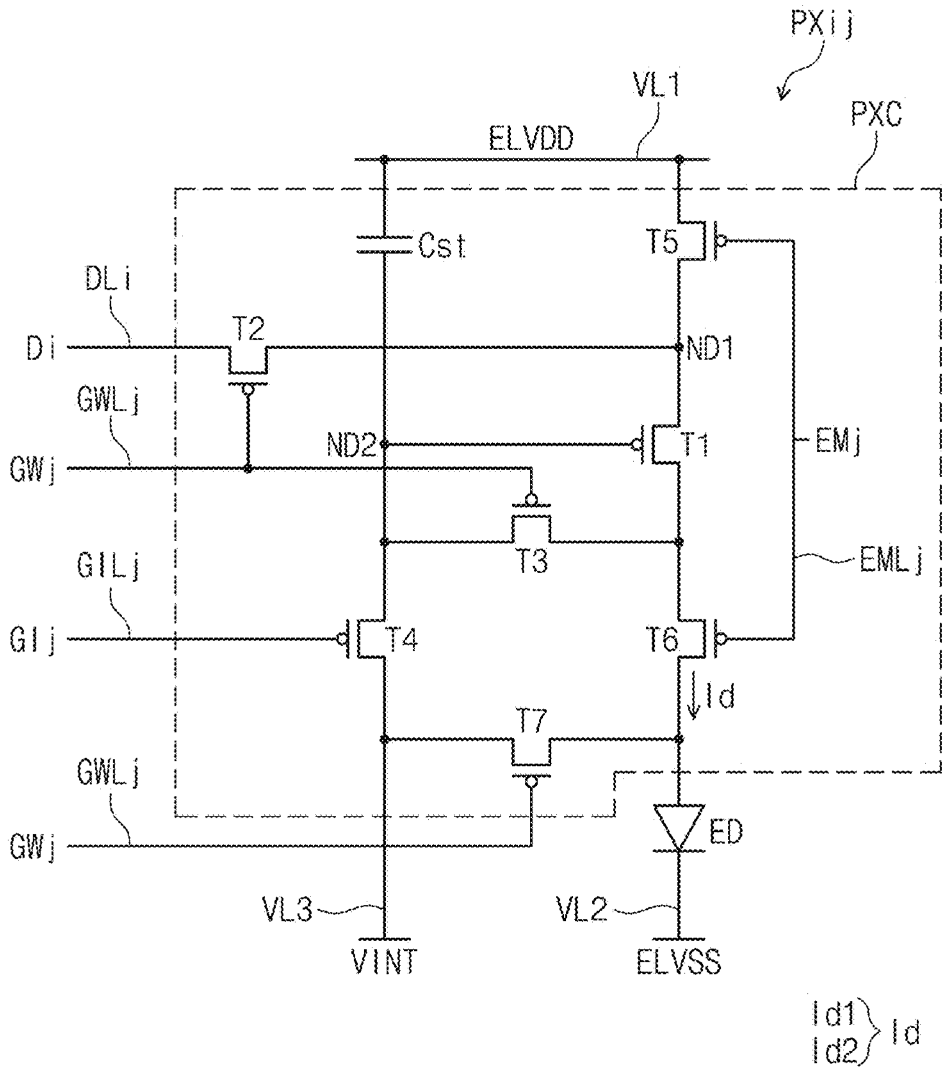
FIG. 3 is an equivalent circuit diagram of a pixel according to an embodiment of the inventive concept.

FIG. 3 is an equivalent circuit diagram of a pixel PXij, which may represent the circuit structure of each of the plurality of pixels PX according to an embodiment of the inventive concept. In the example equivalent circuit diagram of FIG. 3, the pixel PXij is connected to an i-th data line DLi among the data lines DL1 to DLm, the j-th first scan line GILj among the first scan lines GIL1 to GILn, the j-th second scan line GWLj among the second scan lines GWL1 to GWLn, and the j-th emission control line EMLj among the emission control lines EML1 to EMLn, which are shown in FIG. 2.

Each of the plurality of pixels PX shown in FIG. 2 may have the same circuit configuration as the equivalent circuit diagram of the pixel PXij shown in FIG. 3. In this example, the pixel driving circuit PXC of the pixel PXij may include first to seventh transistors T1, T2, T3, T4, T5, T6, and T7. Each of the first to seventh transistors T1 to T7 may be a P-type transistor having an oxide semiconductor as a semiconductor layer. An active level of the P-type transistor may be a low-level voltage, and an inactive level of the P-type transistor may be a high-level voltage. The circuit configuration of the pixel according to an embodiment of the inventive concept is not limited to FIG. 3. The pixel driving circuit PXC shown in FIG. 3 is merely an example, and the configuration of the pixel driving circuit PXC may be different in other embodiments.

More specifically, with reference to FIG. 3, the pixel PXij of the display device according to an embodiment includes the first to seventh transistors T1 to T7, a driving capacitor Cst, and at least one light-emitting diode ED. In this embodiment, an example in which one pixel PXij includes one light-emitting diode ED will be described.

The j-th first scan line GILj may transfer a first scan signal GIj, and the j-th second scan line GWLj may transfer a second scan signal GWj. The j-th emission control line EMLj may transfer an emission signal EMj, and the i-th data line DLi may transfer a data signal Di. The data signal Di may have a voltage level corresponding to the image information RGB input to the display device 1000 (e.g., see FIG. 2). The first to third driving voltage lines VL1, VL2, and VL3 may transfer the first driving voltage ELVDD, the second driving voltage ELVSS, and the initialization voltage VINT, respectively.

The first transistor T1 may be a driving transistor which is electrically connected between the first voltage line VL1 and the light-emitting diode ED. The first transistor T1 includes a first electrode electrically connected to the first voltage line VL1 through the fifth transistor T5, a second electrode electrically connected to an anode of the light-emitting diode ED via the sixth transistor T6, and a gate electrode connected to one end of the driving capacitor Cst. The first electrode may be connected to a first node ND1 and the gate electrode may be connected to a second node ND2. The first electrode of the first transistor T1 may receive the first driving voltage ELVDD through the first voltage line VL1 (when transistor T5 is activated). As stated, the first transistor T1 may be referred to as a driving transistor.

The second transistor T2 is electrically connected between the i-th data line DLi and the first node ND1. The second transistor T2 includes a first electrode connected to the i-th data line DLi, a second electrode connected to the first node ND1, and a gate electrode connected with the j-th second scan line GWLj. The first electrode of the second transistor T2 may receive the data signal Di through the i-th data line DLi. The gate electrode of the second transistor T2 may receive the second scan signal GWj through the j-th second scan line GWLj. The second transistor T2 may be turned on according to the second scan signal GWj to transfer the data signal Di to the first node ND1. Thus, the data signal Di may be transferred to the first transistor T1.

The third transistor T3 may be a compensation transistor which is electrically connected between the second node ND2 and the second electrode of the first transistor T1. The third transistor T3 includes a first electrode connected to the first voltage line VL1 through the driving capacitor Cst, a second electrode connected to the second electrode of the first transistor T1, and a gate electrode connected to the j-th second scan line GWLj. The first electrode of the third transistor T3 may be connected to the second node ND2. The gate electrode of the third transistor T3 may receive the second scan signal GWj through the j-th second scan line GWLj. The third transistor T3 may be turned on according to the second scan signal GWj to connect the gate electrode of the first transistor T1 and the second electrode of the first transistor T1, thereby placing the first transistor T1 in a diode-connected state. The third transistor T3 may be referred to as a compensation transistor.

The fourth transistor T4 may be connected between the second node ND2 and the third voltage line VL3. The fourth transistor T4 includes a first electrode connected to the gate electrode of the first transistor T1, a second electrode connected to the third voltage line VL3, and a gate electrode connected to the j-th first scan line GILj. The first electrode of the fourth transistor T4 may be connected to the second node ND2. The second electrode of the fourth transistor T4 may receive the initialization voltage VINT through the third voltage line VL3. The gate electrode of the fourth transistor T4 may receive the first scan signal GIj through the j-th first scan line GILj. The first scan signal GIj may be different from the second scan signal GWj in terms of timing (as described, for example, with reference to FIG. 5). The fourth transistor T4 is turned on according to the first scan signal GIj to transfer the initialization voltage VINT to the gate electrode of the first transistor T1 and perform an initialization operation for initializing a voltage of the gate electrode of the first transistor T1.

The fifth transistor T5 may be connected between the first voltage line VL1 and the first node ND1. The fifth transistor T5 includes a first electrode connected to the first voltage line VL1, a second electrode connected to the first electrode of the first transistor T1, and a gate electrode connected to the j-th emission control line EMLj. When connected in this manner, the second electrode of the fifth transistor T5 may be connected to the first node ND1. The first electrode of the fifth transistor T5 may receive the first driving voltage ELVDD through the first voltage line VL1. The gate electrode of the fifth transistor T5 may receive the emission signal EMj through the j-th emission control line EMLj.

The sixth transistor T6 may be electrically connected between the first transistor T1 and the light-emitting diode ED. The sixth transistor T6 includes a first electrode connected to the second electrode of the first transistor T1, a second electrode connected to the anode of the light-emitting diode ED, and a gate electrode connected to the j-th emission control line EMLj. The gate electrode of the sixth transistor T6 may receive the emission signal EMj through the j-th emission control line EMLj.

The fifth transistor T5 and the sixth transistor T6 may be substantially simultaneously turned on according to the emission signal EMj. Accordingly, a current path may be provided between the first voltage line VL1 and the light-emitting diode ED. The current flowing through the current path may be a driving current Id for causing the light-emitting diode ED to emit light proportional to the voltage of the data signal Di. The driving current Id may include a first driving current Id1 and a second driving current Id2 that are provided in different frames. For example, the first driving current Id1 may flow in the (n−1)-th frame FRn−1 (see FIG. 5), and the second driving current Id2 may flow in the n-th frame FRn (see FIG. 7).

The seventh transistor T7 may be electrically connected between the light-emitting diode ED and the third voltage line VL3. The seventh transistor T7 includes a first electrode connected to the anode of the light-emitting diode ED, a second electrode connected to the third voltage line VL3, and a gate electrode connected to the j-th second scan line GWLj. The second electrode of the seventh transistor T7 may receive the initialization voltage VINT through the third voltage line VL3. The gate electrode of the seventh transistor T7 may receive the second scan signal GWj through j-th the second scan line GWLj. Thus, the second transistor T2, the third transistor T3 and the seventh transistor T7 may be activated substantially simultaneously. The seventh transistor T7 is turned on according to the second scan signal GWj to bypass a residual current of the anode of the light-emitting diode ED to the third voltage line VL3.

As describe above, one end of the driving capacitor Cst may be connected to the gate electrode of the first transistor T1 through the second node ND2, and the other end may be connected to the first voltage line VL1.

A cathode of the light-emitting diode ED may be connected to the second voltage line VL2, which is configured to transfer the second driving voltage ELVSS. The structure of the pixel PXij according to an embodiment is not limited to the structure shown in FIG. 3, and the number of the transistors and/or capacitors included in one pixel and the connection relationship thereof may be different in other embodiments.

Figure 4:
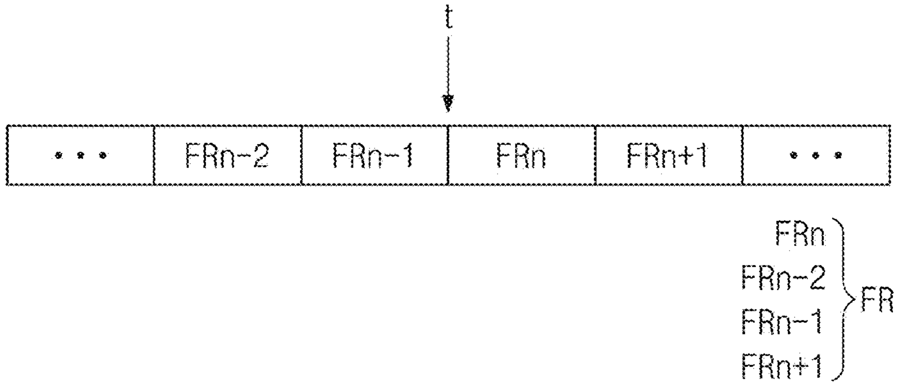
FIG. 4 is a view for describing a frame according to an embodiment of the present disclosure.

FIG. 4 is a view for explaining a frame FR according to an embodiment of the present disclosure.

Referring to FIG. 4, the display panel DP (e.g., see FIG. 2) may be driven in units of one frame FR to display the image 1000-I (e.g., see FIG. 1). In one embodiment, a plurality of frames FR may be provided. For example, the plurality of frames FR may include an (n−2)-th frame FRn−2, an (n−1)-th frame FRn−1, an n-th frame FRn, and an (n+1)-th frame FRn+1.

The pixel PXij of the display panel DP (see FIG. 2), before a prescribed time point t, may display light corresponding to the image 1000-I (see FIG. 1) on the basis of the data signal Di (see FIG. 3) having a relatively low voltage level. For example, in the (n−2)-th frame FRn−2 and the (n−1)-th frame FRn−1, the display panel DP (see FIG. 2) may display a black image.

The pixel PXij of the display panel DP (see FIG. 2), after the prescribed time point t, may display light corresponding to the image 1000-I (see FIG. 1) on the basis of the data signal Di (see FIG. 3) having a relatively high voltage level. For example, in the n-th frame FRn and the (n+1)-th frame FRn+1, the pixel PXij of the display panel DP (see FIG. 2) may display a white image.

Figure 5:
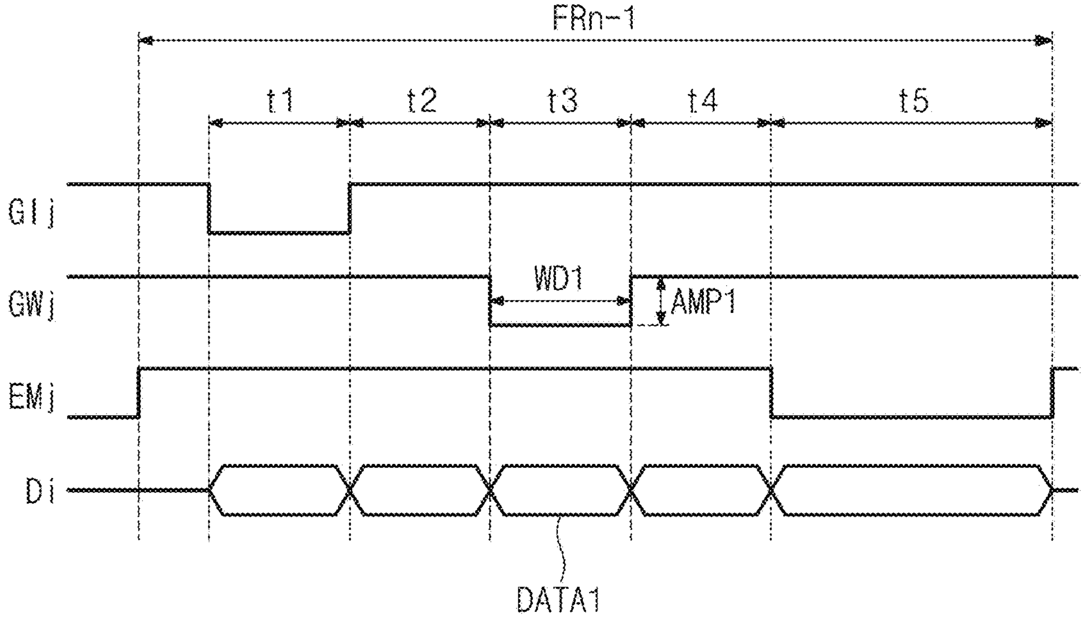
FIG. 5 is a timing diagram for describing the operation of a display device in an (n−1)-th frame according to an embodiment of the inventive concept.
Figure 6:
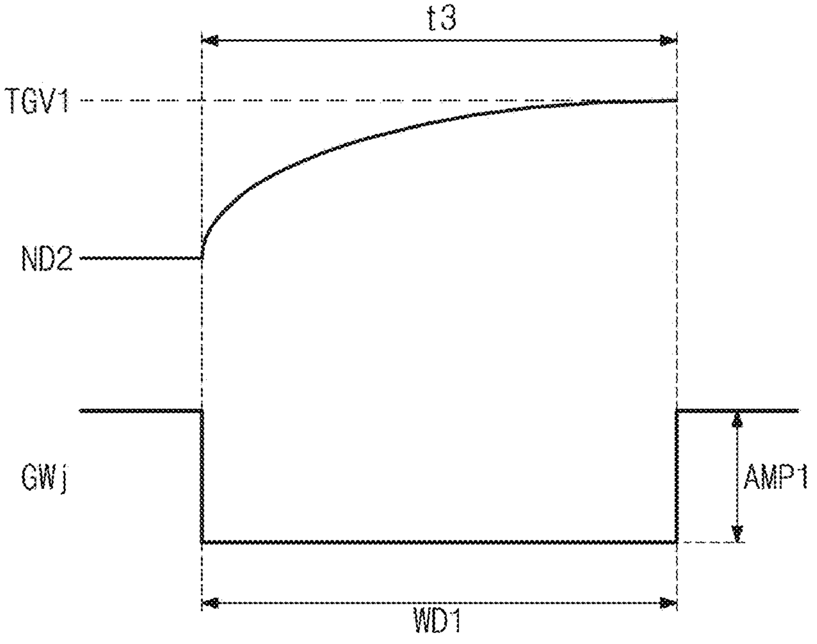
FIG. 6 is a timing diagram for describing a voltage of a second node according to a second scan signal in an (n−1)-th frame according to an embodiment of the inventive concept.

FIG. 5 is a timing diagram for describing the operation of the display device in the (n−1)-th frame according to an embodiment of the inventive concept. FIG. 6 is a timing diagram for describing a voltage level of the second node ND2 according to the second scan signal in the (n−1)-th frame according to an embodiment of the inventive concept.

Referring to FIGS. 3 to 6, the (n−1)-th frame FRn−1 may include first to fifth periods t1, t2, t3, t4, and t5. The first to fourth periods t1 to t4 may be referred to as non-emission periods. The fifth period t5 may be referred to as an emission period. Specifically, the first period t1 may be referred to as an initialization period. The second period t2 may be referred to as a first holding period. The third period t3 may be referred to as a compensation period, or a data-writing period. The fourth period t4 may be referred to as a second holding period.

In the first period t1, the first scan signal GIj may be at an active level. The active level of the first scan signal GIj may be a low level. However, this is merely an example, and the active levels of the signals according to an embodiment are not limited thereto. For example, the active levels of the signals may be high levels for an NMOS implementation of the fourth transistor T4.

In the first period t1, the second scan signal GWj and the emission signal EMj may be at inactive levels. The inactive levels of the second scan signal GWj and the emission signal EMj may be high levels. However, this is merely an example, and the inactive levels of the signals according to an embodiment are not limited thereto. For example, the inactive levels of the signals may be high levels for a PMOS implementation.

The data signal Di may have a prescribed voltage level. The data signal Di may include a first data signal DATA1. In the third period t3, the data signal Di may be the first data signal DATA1.

In operation, the fourth transistor T4 may be turned on in response to the first scan signal GIj having the active level. In this case, the initialization voltage VINT may be provided to the second node ND2. In other words, the gate electrode of the first transistor T1 may be charged with the initialization voltage VINT. Here, any residual current that may exist of the gate electrode of the first transistor T1 may be removed.

The second (or first holding) period t2 may be successive to the first period t1. The first scan signal GIj, the second scan signal GWj, and the emission signal EMj may be at the inactive levels in the second period t2. The inactive level of the first scan signal GIj may be a high level. The third (or compensation or data-writing) period t3 may be successive to the second period t2. The second scan signal GWj may be at the active level, and the first scan signal GIj and the emission signal EMj may be at the inactive levels in the third period t3. The active level of the second scan signal GWi may be a low level.

A target voltage may be determined according to the voltage level of the data signal Di. The second node ND2 is charged to the target voltage to drive the first transistor T1. The target voltage may include a first target voltage TGV1 (e.g., see FIG. 6). When the data signal Di is the first data signal DATA1, the target voltage of the second node ND2 may be referred as the first target voltage TGV1. The process of charging the second node ND2 to the first target voltage TGV1 will be described below.

The second transistor T2 and the third transistor T3 may be turned on in response to the second scan signal GWj having the active level. The second scan signal GWj may have the waveform having a first pulse width WD1 and a first amplitude AMP1 in the (n−1)-th frame FRn−1. (As will be discussed in greater detail below, the waveform of the second scan signal GWj in frame FRn may be controlled to be different from the waveform of the second scan signal GWj in the (n−1)-th frame FRn−1, to provide improved performance. The difference in the waveforms may be expressed as a different pulse width and/or a different amplitude of the second scan signal GWj.)

When the second transistor T2 is turned on, the first data signal DATA1 may be provided to the first node ND1 through the i-th data line DLi. Then, when the third transistor T3 is turned on, the first transistor T1 is diode-connected and is forward biased. When the data signal Di is the first data signal DATA1, the first target voltage TGV1, which is reduced by a threshold voltage Vth of the first transistor T1 from the first data signal DATA1, is applied to the gate electrode of the first transistor T1. In other words, the voltage at the second node ND2 may increase to the first target voltage TGV1 over the third period t3.

The first driving voltage ELVDD and the target voltage TGV1 may be applied to respective ends of the driving capacitor Cst, and charges corresponding to the voltage difference between the both ends may be stored in the driving capacitor Cst.

Meanwhile, the seventh transistor T7 may also be turned on in response to the second scan signal GWj having the active level. When the seventh transistor T7 is turned on, any residual current that may be present on the anode of the light-emitting diode ED may be removed, e.g., bypassed to the third voltage line VL3.

The fourth (or second holding) period t4 may be successive to the third period t3. The first scan signal GIj, the second scan signal GWj, and the emission signal EMj may be at the inactive levels in the fourth period t4.

The fifth (or emission) period t5 may be successive to the fourth period t4. The emission signal EMj may be at the active level, and the first scan signal GIj and the second scan signal GWj may be at the inactive levels in the fifth period t5. The active level of the emission signal EMj may be a low level.

The fifth transistor T5 and the sixth transistor T6 may be turned on in response to the emission signal EMj having the active level. Accordingly, the first driving current Id1 may flow from the first voltage line VL1 through the fifth transistor T5, the first transistor T1, the sixth transistor T6, the light-emitting diode ED, and the second voltage line VL2. When the first driving current Id1 flows through the light-emitting diode ED, the pixel PXij emits light in correspondence to the voltage level of the first data signal DATA1. The pixel PXij may emit light having a first grayscale value in the (n−1)-th frame FRn−1. In other words, the display panel DP (see FIG. 2) may have the first grayscale value in the (n−1)-th frame FRn−1. For example, the first grayscale value may be a 0 grayscale value and the image 1000-I (see FIG. 1) may be represented as black.

Figure 7:
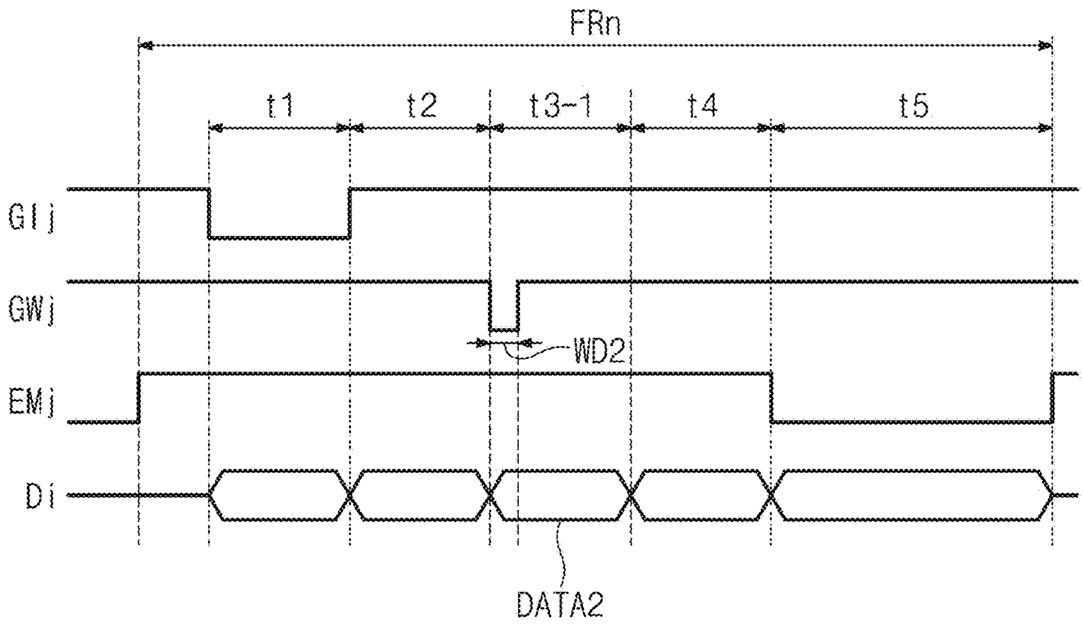
FIG. 7 is a timing diagram for describing the operation of a display device in an n-th frame according to an embodiment of the inventive concept.
Figure 8:
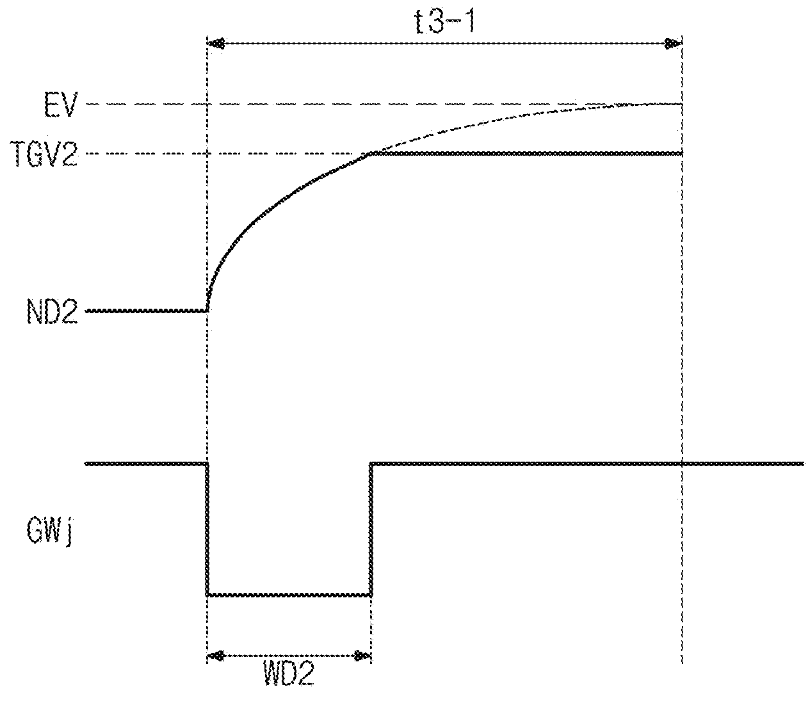
FIG. 8 is a timing diagram for describing a voltage of a second node according to a second scan signal in an n-th frame according to an embodiment of the inventive concept.

FIG. 7 is a timing diagram for describing the operation of the display device in the n-th frame FRn according to an embodiment of the inventive concept. FIG. 8 is a timing diagram for describing a voltage at the second node according to the second scan signal in the n-th frame according to an embodiment of the inventive concept. In description of FIGS. 7 to 8, like numerals are given to the components described with reference to FIGS. 5 and 6, and descriptions thereof will be omitted.

Referring to FIGS. 3 to 8, the n-th frame FRn may refer to a frame that is provided right after the prescribed time point t, as shown in FIG. 4. The display panel DP (see FIG. 2) may display a white image from a black image on the basis of the prescribed time point t. Here, the voltage difference between data signals provided from the black image and the white image may increase.

The n-th frame FRn may include the first to fifth periods t1, t2, t3-1, t4, and t5. The n-th frame FRn may be successive to the (n−1)-th frame FRn−1.

The data signal Di may have a prescribed voltage level. The data signal Di may further include a second data signal DATA2. The data signal Di may be the second data signal DATA2 in the third period t3-1.

The third period t3-1 may be successive to the second period t2. The second scan signal GWj may be at the active level in at least a portion of the third period t3-1. The first scan signal GIj and the emission signal EMj may be at the inactive levels in the third period t3-1.

The memory of the driving controller 100 (see FIG. 2) may include a pulse width look-up table in which a target voltage for each voltage difference between the first data signal DATA1 and the second data signal DATA2 provided to the i-th data line (see FIG. 3) during the (n−1)-th frame FRn−1 and the n-th frame FRn is set and the pulse width of the second scan signal GWj for each target voltage is stored. (In another embodiment the driving controller 100 may include an amplitude look-up table to be used in the manner described in greater detail below).

The second node ND2 may be charged to the target voltage to drive the first transistor T1. When the data signal Di is the second data signal DATA2, the target voltage of the second node ND2 may be referred as the second target voltage TGV2.

The pulse width of the second scan signal GWj may be controlled based on the pulse width look-up table. The pixel driving circuit PXC may charge the second node ND2 to the second target voltage TGV2 in response to the second scan signal GWj of which the pulse width is controlled. The process of charging the second node ND2 to the second target voltage TGV2 will be described below.

The second transistor T2 and the third transistor T3 may be turned on in response to the second scan signal GWj having the active level. The second scan signal GWj provided in the n-th frame FRn may have a different waveform from the second scan signal GWj provided in the (n−1)-th frame FRn−1. The different waveform for the n-th frame FRn may have one or more parameters (e.g., pulse width, amplitude, etc.) that are different from the waveform used for the second scan signal GWj provided in the (n−1)-th frame FRn−1. For example, the second scan signal GWj provided in the n-th frame FRn may have the waveform having an active level during the duration of a second pulse width WD2. The second pulse width WD2 may be different from the first pulse width WD1. For example, the second pulse width WD2 may be smaller than the first pulse width WD1. Accordingly, the second data signal DATA2 may be provided to the second node ND2 for a length of time corresponding to the second pulse width WD2. In other embodiments, as discussed below, the second scan signal GWj may have a different amplitude with a greater pulse width than pulse width WD2.

When the second transistor T2 is turned on, the second data signal DATA2 may be provided to the first node ND1 through the i-th data line DLi. The second data signal DATA2 may be different from the first data signal DATA1. For example, the second data signal DATA2 may have a higher voltage level than that of the first data signal DATA1. The second scan signal GWj provided in the (n−1)-th frame FRn−1 in which the first data signal DATA1 is provided may have a different waveform (e.g., different pulse width and/or different amplitude) from the second scan signal GWj provided in the n-th frame FRn in which the second data signal DATA2 is provided.

When the third transistor T3 is turned on, the first transistor is diode-connected and is forward biased. When the data signal Di is the second data signal DATA2, the second target voltage TGV2, which is reduced by the threshold voltage Vth of the first transistor T1 from the second data signal DATA2, is applied to the gate electrode of the first transistor T1. In other words, the voltage at the second node ND2 may reach (be charged up) to the second target voltage TGV2.

The first driving voltage ELVDD and the second target voltage TGV2 may be applied to both ends of the driving capacitor Cst, and charges corresponding to the voltage difference between the both ends may be stored in the driving capacitor Cst.

The fifth transistor T5 and the sixth transistor T6 may be turned on in response to the emission signal EMj in the fifth period t5. Accordingly, the second driving current Id2 may flow from the first voltage line VL1 through the fifth transistor T5, the first transistor T1, the sixth transistor T6, and the light-emitting diode ED and then to the second voltage line VL2. When the second driving current Id2 flows through the light-emitting diode ED, the pixel PXij emits light in correspondence to the voltage level of the second data signal DATA2. The pixel PXij may emit light having a second grayscale value in the n-th frame FRn. The second grayscale value may be greater than the first grayscale value. For example, the display panel DP (e.g., see FIG. 2) may have the second grayscale value in the n-th frame FRn. For example, the second grayscale value may be a 127 grayscale value represented as white.

The second driving current Id2 may be determined based on Equations 1 to 3 provided below.

$$Id2 = \frac{1}{2} \cdot \mu \cdot Cox \cdot \frac{W}{L}(Vgs - Vth)^2 \quad (1)$$

$$Vgs = ELVDD - (Vdata2 - Vth) \quad (2)$$

$$Id2 = \frac{1}{2} \cdot \mu \cdot Cox \cdot \frac{W}{L}(ELVDD - (Vdata2 - Vth) - Vth)^2 \quad (3)$$

In Equations 1 to 3, may be field mobility, Cox may be a capacitance of a gate insulation film, W/L may be a width over a length of the first transistor T1, and Vgs may be a gate-source voltage of the first transistor T1. Vdata2 may be a voltage level of the second data signal DATA2 transferred through the second transistor T2 and applied for a duration that is as long as a time corresponding to the second pulse width WD2. In one embodiment, and Cox may be constants. The expression (Vdata2−Vth) may be the second target voltage TGV2 as shown, for example, in FIG. 8, namely, the amount of charging the second node ND2. This may be confirmed in Equation 3, which indicates that as the amount of charging the second node ND2 decreases, the second driving current Id2 increases.

The description is provided based on the second driving current Id2 in Equations 1 to 3, when the data signal Di is the first data signal DATA1, Vdata2 is changed to the voltage level of the first data signal DATA1 in Equations 1 to 3, and the first driving current Id1 may be determined based on Equations 1 to 3.

In addition, the threshold voltage Vth of the first transistor T1 included in each of the pixels PXij may be different according to the characteristics of the first transistor T1. However, according to the inventive concept, the threshold voltage Vth of the first transistor T1 may not affect the driving current Id flowing through the light-emitting diode ED in the first to fourth periods t1, t2, t3-1, and t4. Referring to Equation 3, the driving current Id flowing through the light-emitting diode ED may not be affected by the threshold voltage Vth of the first transistor T1 in the fourth period t4. Accordingly, the luminance of the image 1000-I (see FIG. 1) may be uniformly maintained on the display panel DP (see FIG. 2). Accordingly, the pixels PXij and the display device DD (see FIG. 1) having improved display quality may be provided.

In some display devices, the display panel DP may display a black image according to the hysteresis characteristics of the first transistors T1 in frames FRn−2 and FRn−1 before the prescribed time point t. In this case, when the display panel DP displays a white image in frames FRn and FRn+1 after the prescribed time point t, a step efficiency (in which the grayscale of the display panel becomes lower than a desired grayscale and/or luminance) may be generated in the n-th frame FRn that is the first frame after the prescribed time point t. In this case, a user may view an afterimage due to reduction in the luminance in the n-th frame FRn when the black image changes to the white image. According to the inventive concept, however, in order to charge the second node ND2 only to the target voltage TGV2, the pixel driving circuit PXC may receive the second scan signal GWj having the second pulse width WD2. Accordingly, the display panel DP (see FIG. 2) may obtain the desired second grayscale value in the n-th frame FRn. In addition, the afterimage may be reduced or removed. Accordingly, the display device 1000 (see FIG. 2) having improved display quality may be provided.

On the other hand, if the second data signal DATA2 has the first pulse width WD1, the second data signal DATA2 may be compensated in order to adjust the amount of charging the second node ND2 according to the second target voltage TGV2. However, when the second data signal DATA2 is compensated, the grayscale range expressed by the data driving circuit 200 (see FIG. 2) may increase. In this case, due to the increased grayscale expression range, power consumption of the data driving circuit 200 (see FIG. 2) may increase. According to the inventive concept, however, only the pulse width of the second scan signal GWj may be controlled at the second node ND2 to charge the second node ND2 to the second voltage TGV2. Accordingly, the display device 1000 (see FIG. 2) having reduced power consumption may be provided.

In addition, according to the inventive concept, the pulse width of the second scan signal GWj may have the second pulse width WD2 that is relatively small in the n-th frame FRn, compared to the pulse width WD1 of the second scan signal GWj provided in the (n−1)-th frame FRn−1. Accordingly, the display device according to an embodiment of the inventive concept may be easily applied in a high speed driving environment.

Figure 9:
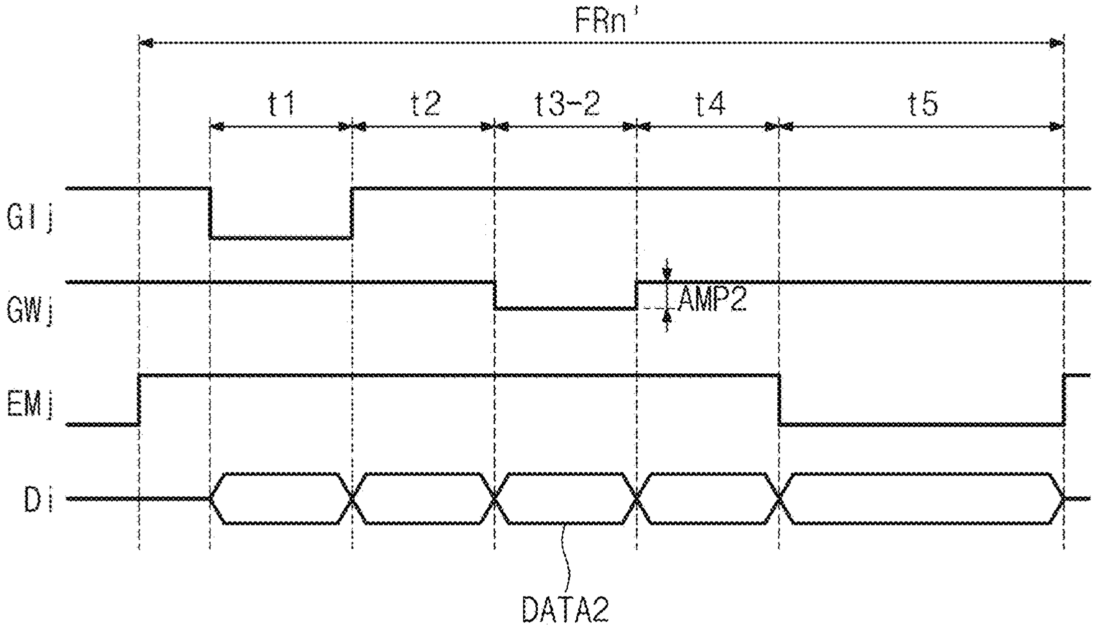
FIG. 9 is a timing diagram for describing the operation of a display device in an n-th frame according to an embodiment of the inventive concept.
Figure 10:
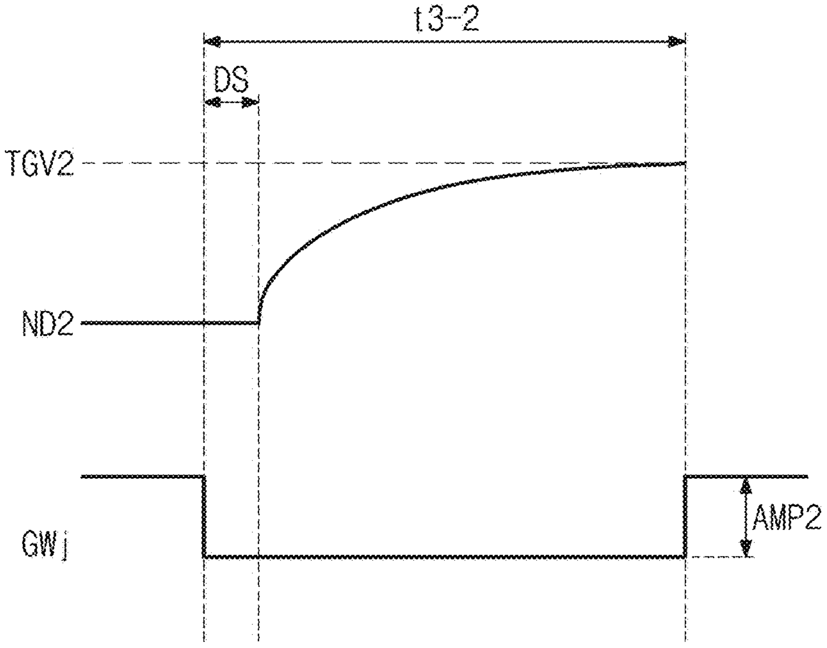
FIG. 10 is a timing diagram for describing a voltage of a second node according to a second scan signal in an n-th frame according to an embodiment of the inventive concept.

FIG. 9 is a timing diagram for describing the operation of the display device in the n-th frame according to another embodiment of the inventive concept. FIG. 10 is a timing diagram for describing a voltage at the second node according to the second scan signal GWj in the n-th frame according to an embodiment of the inventive concept. As discussed in greater detail below, the waveform of the second scan signal GWj is different from the waveform of the second scan signal GWj in the embodiment of FIG. 7. In description of FIGS. 9 to 10, like numerals are given to the like components described with reference to FIGS. 5 and 6, and therefore redundant descriptions thereof will be omitted.

Referring to FIGS. 3 to 6, 9, and 10, the n-th frame FRn' may include first to fifth periods t1, t2, t3-2, t4, and t5. The n-th frame FRn' may be successive to the (n−1)-th frame FRn−1. The scan signal GIj and the emission signal EMj in may be the same or similar to the waveforms of these signals shown in FIG. 7.

The waveform of the second scan signal GWj in the third period t3-2 may be different from the waveform of the second scan signal GWj in the third period t3-1 in FIG. 7. The third period t3-2 may be successive to the second period t2. The second scan signal GWj may be at an active level, and the first scan signal GIj and the emission signal EMj may be at inactive levels in the third period t3-2. The data signal Di may be the second data signal DATA2 in the third period t3-2.

The memory of the driving controller 100 (see FIG. 2) may include an amplitude look-up table in which the target voltage for each voltage difference between the first data signal DATA1 and the second data signal DATA2 is set and the amplitude of the second scan signal GWj for each target voltage is stored. In this case, the second data signal DATA2 is provided to the i-th data line (see FIG. 3) during in the (n−1)-th frame FRn−1 and the n-th frame FRn'.

The amplitude of the second scan signal GWj may be controlled based on the amplitude look-up table. The pixel driving circuit PXC may charge the second node ND2 to the second target voltage TGV2 in response to the second scan signal GWj of which the amplitude is controlled. Here, the amplitude of the second scan signal GWj may be controlled. The process of charging the second node ND2 to the second target voltage TGV2 will be described below.

The second transistor T2 and the third transistor T3 may be turned on in response to the second scan signal GWj. The second scan signal GWj provided in the n-th frame FRn' may have a different waveform from the second scan signal GWj provided in the (n−1)-th frame FRn−1. For example, the second scan signal GWj provided in the n-th frame FRn' have a second amplitude AMP2, which is different from (e.g., smaller than) the amplitude AMP1 of the second scan signal applied in FIG. 5. That is, the second amplitude AMP2 may have a different magnitude from the first amplitude AMP1 (see FIG. 5). For example, the first amplitude AMP1 may be greater than the second amplitude AMP2.

When the second transistor T2 is turned on, the second data signal DATA2 may be provided to the first node ND1 through the i-th data line DLi. The second data signal DATA2 may be different from the first data signal DATA1 applied in the (n-t)-th frame FRn−1. For example, the second data signal DATA2 may have a higher voltage level than the first data signal DATA1.

When the third transistor T3 is turned on, the first transistor is diode-connected and is forward biased. Here, the second scan signal GWj has the second amplitude AMP2 smaller than the first amplitude AMP1. Thus, a time at which the second transistor T2 is turned on may be delayed by a delay period DS.

When the second transistor T2 is turned on after the delay period DS (e.g., FIG. 10), the second node ND2 may be charged. Then, the second target voltage TGV2, which is reduced by the threshold voltage Vth of the first transistor T1 from the second data signal DATA2, is applied to the gate electrode of the first transistor T1. In other words, the voltage at the second node ND2 may reach to the second target voltage TGV2 as shown in FIG. 10.

The first driving voltage ELVDD and the second target voltage TGV2 may be applied to respective ends of the driving capacitor Cst, and charges corresponding to the voltage difference between the respective ends may be stored in the driving capacitor Cst.

Furthermore, the seventh transistor T7 may be turned on in response to an active level of the second scan signal GWj. When the seventh transistor T7 is turned on, any residual current that may exist at the anode of the light-emitting diode ED may removed, e.g., bypassed to the third voltage line VL3.

The fifth transistor T5 and the sixth transistor T6 may be turned on in response to the emission signal EMj in the fifth period t5. Accordingly, the second driving current Id2 may flow from the first voltage line VL1 through the fifth transistor T5, the first transistor T1, the sixth transistor T6, the light-emitting diode ED, and the second voltage line VL2. When the second driving current Id2 flows through the light-emitting diode ED, the pixel PXij emits light in correspondence to the voltage level of the second data signal DATA2. The pixel PXij may emit light having the second grayscale value in the n-th frame FRn'. The second grayscale value may be greater than the first grayscale value. For example, the display panel DP (see FIG. 2) may have the second grayscale value in the n-th frame FRn'. For example, the second grayscale value may be a 127 grayscale value represented as white.

A display panel DP may display a black image according to the hysteresis characteristics of the first transistors T1 in frames FRn−2 and FRn−1 before the prescribed time point t (see FIG. 4). When the display panel DP displays a white image in frames FRn and FRn+1 after the prescribed time point t, a step efficiency, in which the grayscale of the display panel becomes lower than a desired grayscale, may be generated in the n-th frame FRn that is the first frame in which the white image is displayed. As a result, a user may view an afterimage due to reduction in the luminance in the n-th frame FRn' when the black image changes to the white image. According to the inventive concept, however, in order to charge the second node ND2 only to the second target voltage TGV2, the pixel driving circuit PXC may receive the second scan signal GWj having the second amplitude AMP2. Accordingly, the display panel DP (see FIG. 2) may obtain the desired second grayscale value in the n-th frame FRn'. In addition, the afterimage may be reduced or removed. Accordingly, the display device 1000 (see FIG. 2) having improved display quality may be provided.

According to the above description, unlike the (n−1)-th frame FRn−1, the pixel driving circuit PXC may control the second scan signal GWj in the n-th frame FRn in order to charge the second node ND2 only to the second target voltage TGV2. For example, the pulse width or amplitude of the second scan signal GWj may be controlled. Accordingly, in the n-th frame FRn, the display panel DP may obtain the desired second grayscale value. An afterimage may also be reduced or removed. Accordingly, the display device 1000 having the improved display quality may be provided. In one embodiment, both the pulse width and amplitude of the second scan signal GWj may be controlled with reference to different look-up tables.

While this invention has been described with reference to exemplary embodiments thereof, it will be clear to those of ordinary skill in the art to which the invention pertains that various changes and modifications may be made to the described embodiments without departing from the spirit and technical area of the invention as defined in the appended claims and their equivalents. Thus, the scope of the inventive concept shall not be restricted or limited by the foregoing description, but be determined by the broadest permissible interpretation of the following claims. The embodiments may be combined to form additional embodiments.

What is claimed is:

1. A display device comprising:

a display panel configured to be driven in units of frame, the display panel comprising a pixel including a pixel driving circuit receiving a first scan signal and a second scan signal different from the first scan signal and a light-emitting diode electrically connected to the pixel driving circuit, wherein the pixel driving circuit comprises:

a first transistor comprising a first electrode configured to receive a first driving voltage and electrically connected to a first node, a second electrode electrically connected to the light-emitting diode, and a gate electrode electrically connected to a second node; and a second transistor comprising a first electrode configured to receive a data signal, a second electrode electrically connected to the first node, and a gate electrode configured to receive the second scan signal, wherein:

the frame comprises successive first and second frames, the data signal comprises a first data signal and a second data signal different from the first data signal, when the first data signal is provided in the first frame and the second data signal is provided in the second frame, the second scan signal provided in the first frame has a different waveform from the second scan signal provided in the second frame, and the light-emitting diode is configured to emit light having a first grayscale value in the first frame, and the light-emitting diode is configured to emit light having a second grayscale value higher than the first grayscale value in the second frame.

2. The display device of claim 1, wherein the second data signal has a higher voltage level than the first data signal.

3. The display device of claim 1, wherein:

the second scan signal provided in the first frame has a first pulse width, and the second scan signal provided in the second frame has a second pulse width different from the first pulse width.

4. The display device of claim 3, wherein the second pulse width is smaller than the first pulse width.

5. The display device of claim 1, wherein:

the second scan signal provided in the first frame has a first amplitude, and the second scan signal provided in the second frame has a second amplitude different from the first amplitude.

6. The display device of claim 5, wherein the first amplitude is greater than the second amplitude.

7. The display device of claim 1, further comprising:

a driving capacitor connected between a first voltage line through which the first driving voltage is provided and the second node.

8. The display device of claim 1, further comprising:

a third transistor comprising a first electrode electrically connected to the second electrode of the first transistor, a second electrode electrically connected to the second node, and a gate electrode configured to receive the second scan signal.

9. The display device of claim 1, further comprising:

a fourth transistor comprising a first electrode electrically connected to the second node, a second electrode configured to receive an initialization voltage, and a gate electrode configured to receive the first scan signal.

10. The display device of claim 9, further comprising:

a fifth transistor comprising a first electrode configured to receive the first driving voltage, a second electrode electrically connected to the first node, and a gate electrode configured to receive an emission signal.

11. The display device of claim 10, further comprising:

a sixth transistor comprising a first electrode electrically connected to the second electrode of the first transistor, a second electrode electrically connected to the light-emitting diode, and a gate electrode configured to receive the emission signal.

12. The display device of claim 10, further comprising:

a seventh transistor comprising a first electrode electrically connected to the light-emitting diode, a second electrode configured to receive the initialization voltage, and a gate electrode configured to receive the second scan signal.

13. A display device comprising:

a display panel configured to be driven in units of a frame, and comprising a pixel including a pixel driving circuit receiving a first scan signal and a second scan signal different from the first scan signal and a light-emitting diode electrically connected to the pixel driving circuit, wherein the pixel driving circuit comprises:

a first transistor comprising a first electrode configured to receive a first driving voltage and electrically connected to a first node, a second electrode electrically connected to the light-emitting diode, and a gate electrode electrically connected to a second node; and a second transistor comprising a first electrode configured to receive a data signal, a second electrode electrically connected to the first node, and a gate electrode configured to receive the second scan signal, wherein:

the frame comprises successive first and second frames, the data signal comprises a first data signal and a second data signal different from the first data signal, when the first data signal is provided in the first frame and the second data signal is provided in the second frame, a pulse width of the second scan signal provided in the first frame is different from a pulse width of the second scan signal provided in the second frame, and the light-emitting diode is configured to emit light having a first grayscale value in the first frame, and the light-emitting diode is configured to emit light having a second grayscale value higher than the first grayscale value in the second frame.

14. The display device of claim 13, wherein the second data signal has a voltage level higher than the first data signal.

15. The display device of claim 13, wherein:

the second scan signal provided in the first frame has a first pulse width, and the second scan signal provided in the second frame has a second pulse width smaller than the first pulse width.

16. The display device of claim 13, further comprising:

a third transistor comprising a first electrode electrically connected to the second electrode of the first transistor, a second electrode electrically connected to the second node, and a gate electrode configured to receive the second scan signal.

17. The display device of claim 13, further comprising:

a fourth transistor comprising a first electrode electrically connected to the second node, a second electrode configured to receive an initialization voltage, and a gate electrode configured to receive the first scan signal.

18. The display device of claim 13, further comprising:

a fifth transistor comprising a first electrode configured to receive the first driving voltage, a second electrode electrically connected to the first node, and a gate electrode configured to receive an emission signal.

19. A method for controlling operation of a display device which includes a pixel driving circuit electrically connected to a light-emitting diode, the pixel driving circuit including a driving transistor and a compensation transistor controlled by a scan signal to place the driving transistor in a diode-connected state, the method comprising:

charging a node coupled to a gate of the driving transistor based on a voltage of a first data signal applied in a first frame, the node charged to a first target voltage based on a first parameter of the scan signal;

controlling emission of light from the light-emitting diode of the pixel based on the first target voltage;

determining a difference between a voltage of a second data signal and the voltage of the first data signal;

determining a second parameter of the scan signal based on the difference between the voltage of the second data signal and the voltage of the first data signal;

charging the node coupled to the gate of the driving transistor based on the voltage of the second data signal in a second frame, the node charged to a second target voltage based on the second parameter of the scan signal; and controlling emission of light from the light-emitting diode of the pixel based on the second target voltage.

20. The method of claim 19, wherein:

the first parameter is a first width of the scan signal;

the second parameter is a second width of the scan signal; and the second width is less than the first width.

21. The method of claim 19, wherein:

the first parameter is a first amplitude of the scan signal;

the second parameter is a second amplitude of the scan signal; and the second amplitude is less than the first amplitude.

22. The method of claim 19, wherein:

the first data signal corresponds to a first grayscale value;

the second data signal corresponds to a second grayscale value; and the second grayscale value is greater than the first grayscale value.

* * * * *